Oct. 25, 1932.  W. F. VERNON  1,885,020
MOUNTING MEANS FOR A SIGN OR THE LIKE
Filed Sept. 6, 1932
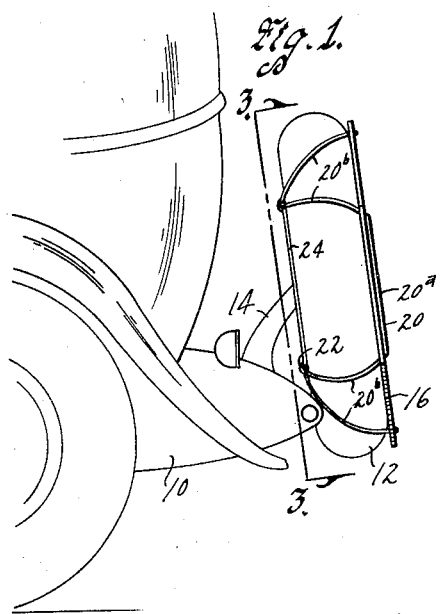
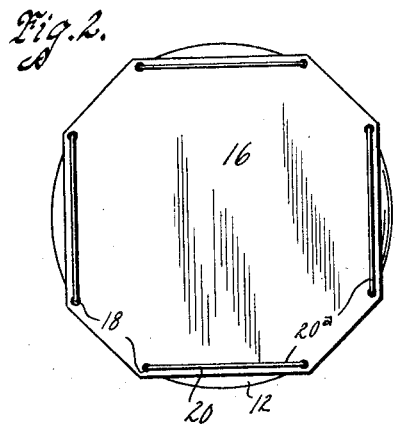
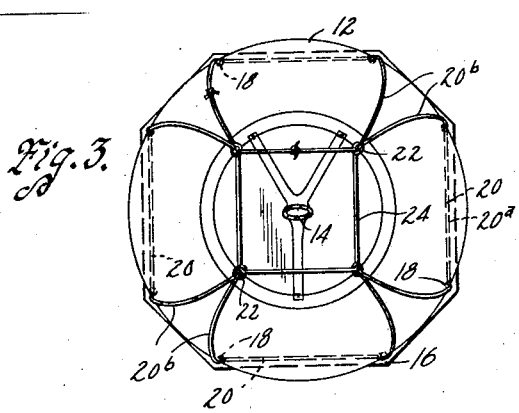
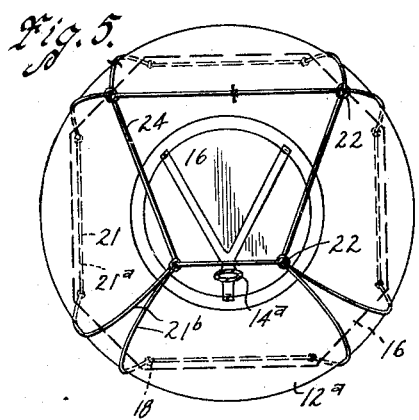
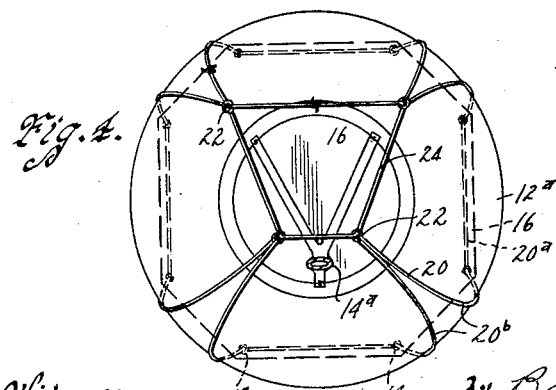
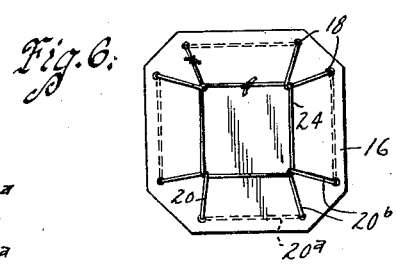
Inventor
William F. Vernon
By Bair, Freeman & Sinclair
Attorneys
Witness Patented Oct. 25, 1932

1,885,020

UNITED STATES PATENT OFFICE

WILLIAM F. VERNON, OF NEWTON, IOWA

MOUNTING MEANS FOR A SIGN OR THE LIKE

Application filed September 6, 1932. Serial No. 631,780.

The object of my invention is to provide mounting means for a sign or the like which is simple, durable and comparatively inexpensive to manufacture.

A further object is to provide means readily adjustable for mounting a sign on the spare tire of an automobile so that it can be effectively displayed to anyone behind the automobile.

Still a further object is to provide a simple arrangement of cords, some or all of which are elastic and which hold a cardboard sign or the like against one surface of a tire by extending over the bead of the tire and across the other surface thereof.

Still a further object is to provide mounting means for a sign, which means is readily adjustable for different sizes of tires and to accommodate different obstructions such as tire carrier brackets.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of the rear portion of an automobile showing a sign mounted on the spare tire thereof by my improved mounting means.

Figure 2 is a rear elevation of the sign on the tire.

Figure 3 is a front elevation of the spare tire and sign mounted thereon and is a partially sectional view as taken on the line 3—3 of Figure 1.

Figure 4 is a similar view showing the mounting means adjusted to a larger diameter tire and also adjusted to accommodate a different type of spare tire bracket.

Figure 5 is a view similar to Figure 4 showing a construction using elastic on the inner cord only; and Figure 6 is a front elevation of a sign showing a modified arrangement of the cords which are used to hold the sign on a tire.

On the accompanying drawing, I have used the reference numeral 10 to indicate generally an automobile. A spare tire is shown at 12 and a bracket for mounting it is shown at 14.

The reference numeral 16 indicates a sign which may be made of cardboard, metal, or any suitable material and of any desired shape and size. Through the sign 16, I provide a plurality of openings 18 which are perimetrically spaced. They may be actually adjacent the periphery of the sign or spaced inwardly any distance from the periphery, as found most feasible.

Laced through the openings 18, is an elastic cord 20. As clearly shown on the drawing, the cord is laced successively through the openings and alternating portions of the cord lie on opposite sides of the sign 16. The portions on the back face of the sign are indicated as 20a and those on the front face as 20b. The portions 20b are arranged V-shaped and at their apices, rings 22 of wire or the like are provided. A closed loop 24 of elastic cord successively extends through the rings 22.

As shown in Figure 3, the V-shaped portions 20b extend each in a generally radial direction over the bead of the tire 12 and the closed loop 24 encircles the tire carrier bracket 14. My particular arrangement of the V-shaped portions 20b makes the device adaptable for tires of various sizes. In Figure 4, for instance, a tire 12a of larger diameter is illustrated. The cords 20 and 24 are merely stretched to a greater degree so that the portions 20b can extend further from the center of the sign and accommodate the periphery of the tire.

The cord 20, of course, is shiftably associated with the openings 18 and therefore it is possible to adjust some of the portions 20b by lengthening them and others by shortening them, as shown in Figure 4. This makes it possible to bring the loop 24 to an off-center position to clear the tire carrier 14a shown in this figure which is mounted below the center of the tire. Thus it is possible to mount the sign 16 on the tire 12a by adjusting the cords 20b and 24 so that they can be slipped down over the top of the tire. In Figure 3, on the other hand, part are slipped over the top and part are slipped up from below.

This makes the mounting means universally adjustable for different sizes of tires and different types of tire carriers.

In Figure 5, I have shown a cord 21 with its portions 21a and 21b to be substituted for the cord 20 with its portions 20a and 20b. The cord 21 is not elastic. The cord 24, however, is elastic, the same as in Figures 3 and 4. Even with the cord 21 of non-elastic material, all the desired adjustments possible with the form of invention shown in Figures 3 and 4 may be made for fitting various sized tires and different types of tire carrier brackets.

There is one advantage with the cord 21 which is not had with the cord 20. The elastic cord 20 of Figure 4 can creep through the openings 18 and permit some slight misalinement of the sign 16 relative to the tire 12a especially on rough roads.

With the cord 21, however, which is non-elastic, there is a certain degree of binding of the cord on the edges of the openings 18 which results in a tendency to retain the portions 21b in the position of their original adjustment.

A further advantage of using the non-elastic cord 21 is that by the binding on the edges of the openings 18, the tendency for the lower stretch of the loop 24 to shift down against the bracket 14 where it might vibrate and wear is eliminated. The openings 18 are preferably metal eyelets set in the sign 16 when it is made of cardboard or other light material.

As shown in Figure 6, the rings 22 may be eliminated if desired. The loop 24 merely extends through the apex of each cord portion 20b. The sign in this figure is not shown applied on a tire and illustrates the positions of the cords when the device is not in use, as for instance when it is being stored or shipped.

Some changes may be made in the construction and arrangement of the parts of my device without departing from the real spirit and purpose of my invention; and it is my intention to cover by my claims, any modified forms of structure or use of mechanical equivalents, which may be reasonably included within their scope.

I claim as my invention:

1. Mounting means for a sign or the like having a plurality of perimetrically spaced openings therein, said mounting means comprising a closed loop of cord shiftably laced through said openings successively and a closed loop of cord shiftably associated with the central parts of the portions of the first loop of cord which lie on one side of said sign.

2. Mounting means for a sign or the like having a plurality of perimetrically spaced openings therein, said mounting means comprising a cord laced through said openings successively with portions of the cord between the openings alternately arranged on opposite sides of said sign and a cord laced through all the portions of the first cord which are positioned on one side of the sign.

3. Mounting means for a sign or the like having a plurality of perimetrically spaced openings therein, said mounting means comprising a closed loop of cord shiftably laced through said openings successively and a closed loop of elastic cord shiftably associated with the central parts of the portions of the first loop of cord which lie on one side of said sign.

4. Mounting means for a sign or the like having a plurality of perimetrically spaced openings therein, said mounting means comprising a closed loop of elastic cord shiftably laced through said openings successively and a closed loop of elastic cord shiftably associated with the central parts of the portions of the first loop of elastic cord which lie on one side of said sign.

5. Mounting means for a sign or the like comprising V-shaped cords having ends connected with the periphery of the sign and a loop of cord shiftably associated with the apices of the V-shaped cords.

6. Mounting means for a sign or the like comprising V-shaped cords having ends connected with the periphery of the sign and a loop of elastic cord shiftably associated with the apices of the V-shaped cords.

7. Mounting means for a sign or the like comprising V-shaped elastic cords having ends connected with the periphery of the sign and a loop of elastic cord shiftably associated with the apices of the V-shaped cords.

8. Mounting means for a sign or the like comprising V-shaped cords having ends adjustably connected with the periphery of the sign and a loop of cord shiftably associated with the apices of the V-shaped cords.

9. In a device of the class described a sign, polygonally arranged spaced openings therein, a cord laced successively through said openings and means for connecting together the central points of each portion of the cord on one surface of the sign.

10. In a device of the class described, a sign, polygonally arranged spaced openings therein, a cord laced successively through said openings and means for connecting together the central points of each portion of the cord on one surface of the sign, said means comprising a loop of elastic cord.

11. In a device of the class described, a sign, polygonally arranged spaced openings therein, a cord laced successively through said openings, a ring on the central part of each portion of the cord on one side of the surface of the sign and a closed loop of elastic cord through said rings.

WILLIAM F. VERNON.